UNITED STATES PATENT OFFICE.

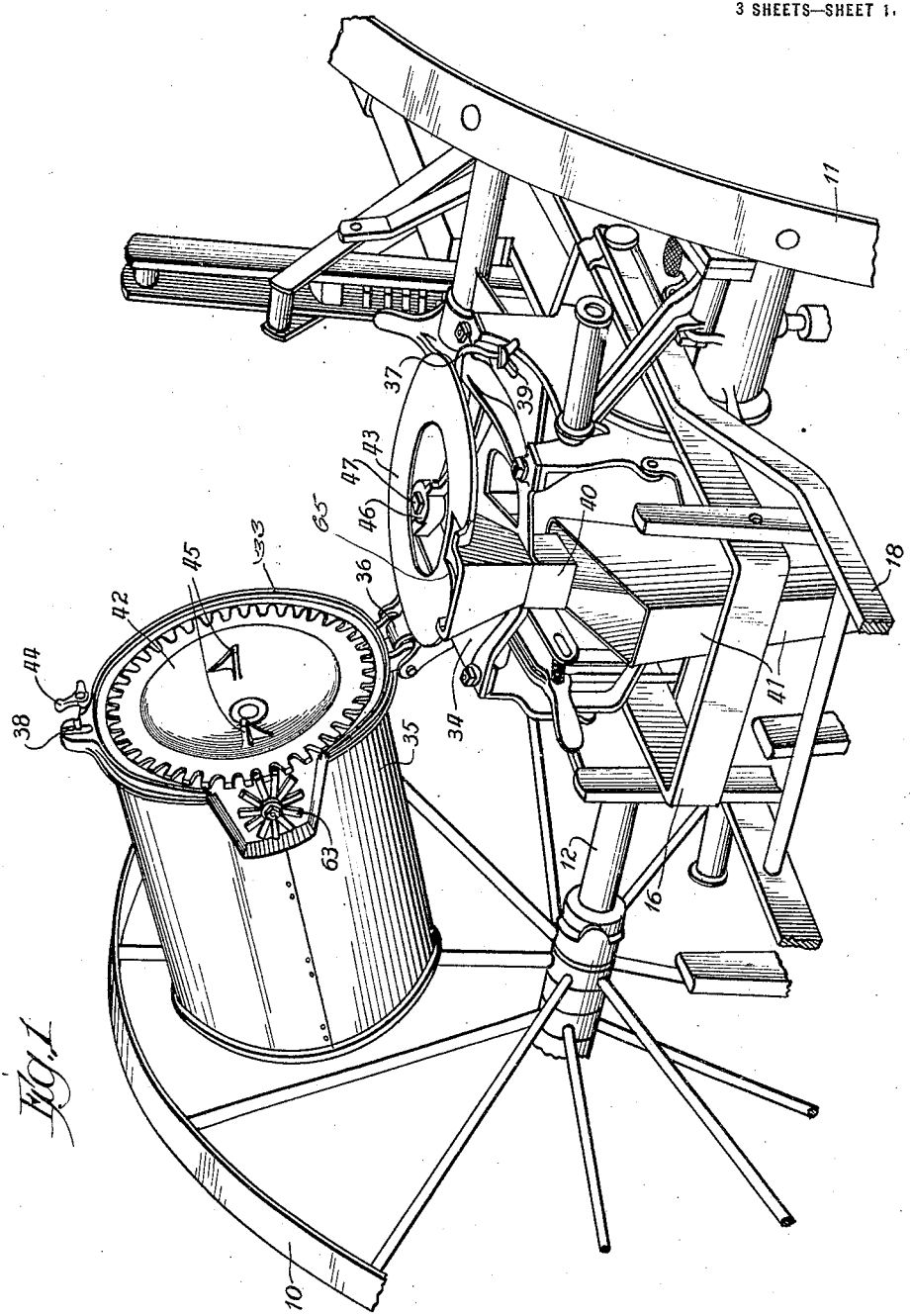

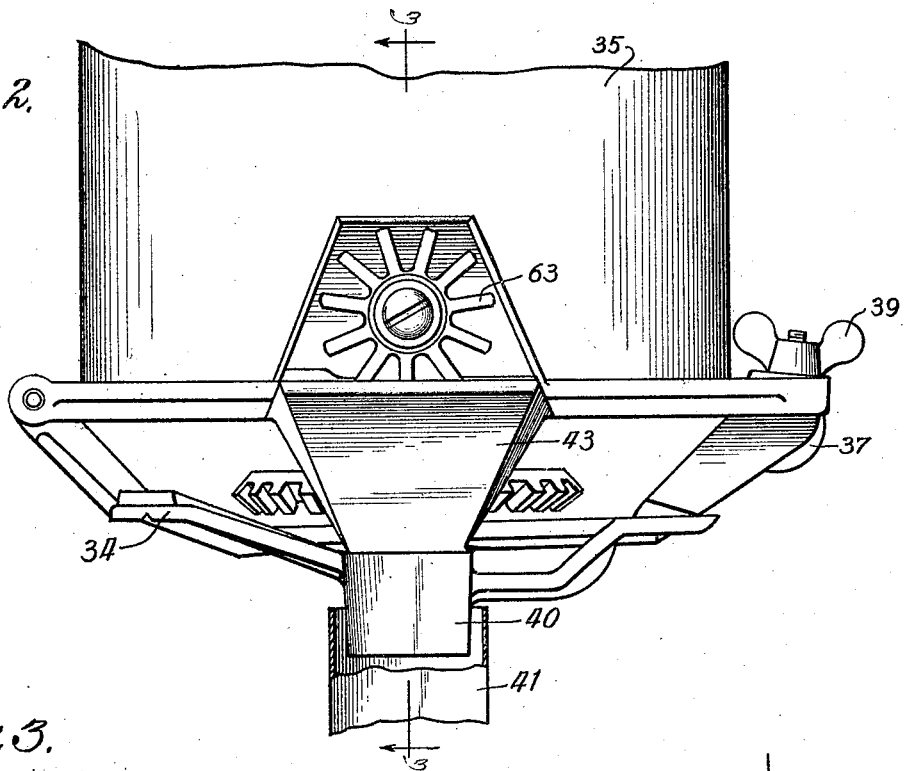
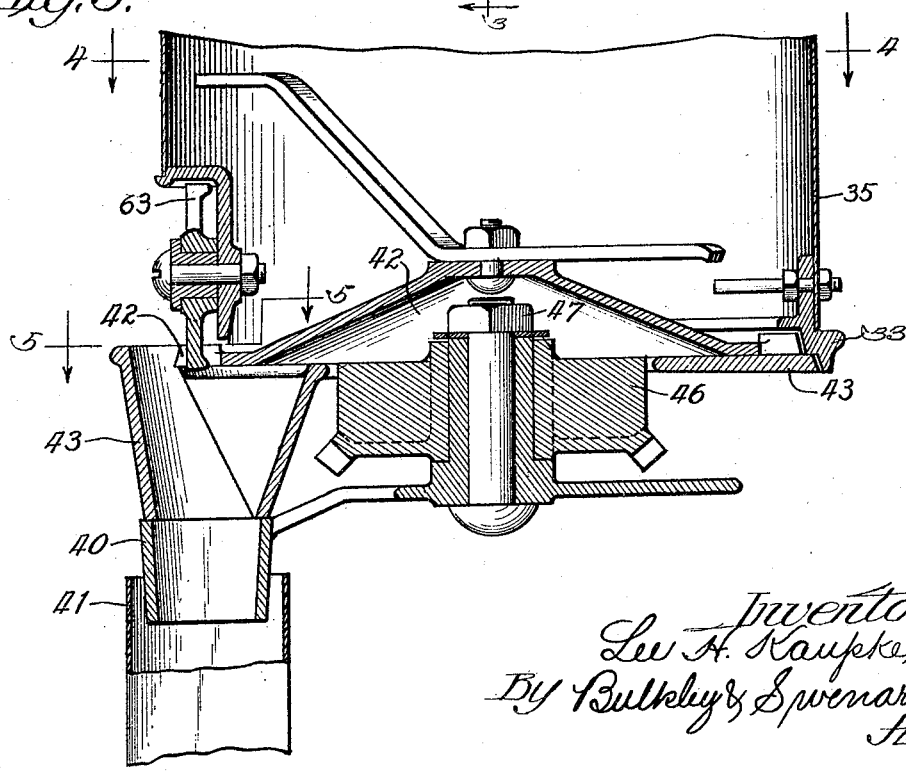

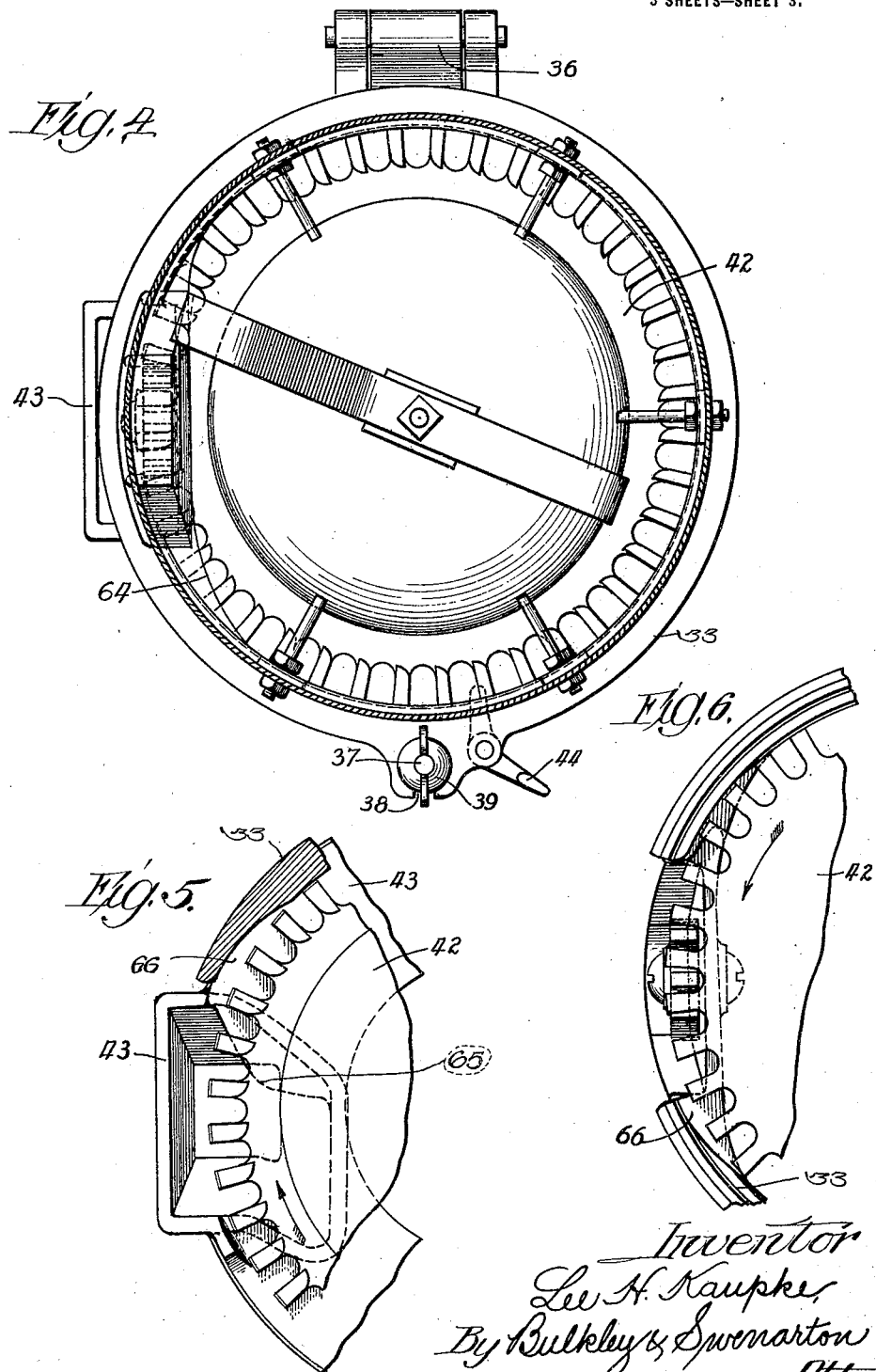

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS.

COTTON PLANTER.

1,405,037. Specification of Letters Patent. Patented Jan. 31, 1922.

Application filed July 19, 1920. Serial No. 397,166.

*To all whom it may concern:*

Be it known that I, LEE H. KAUPKE, a citizen of the United States of America, and resident of Rock Island, Rock Island County, Illinois, have invented a certain new and useful Improvement in Cotton Planters, of which the following is a specification.

My invention relates to a cotton planter, and has for its object the provision of an improved machine for planting cotton seed, and one in which the seed will be planted uniformly and without danger of cracking the seed, and in which the seed plate may be easily changed to adapt the machine for planting seed of different kinds and sizes.

More specifically, my invention consists in having the seed can hinged so that it can be tipped over to permit easy access to be had to the bottom of same, and in having the seed plate so held in place that it may be removed through the bottom of the can.

Further specific objects consist in improved cut-off means for removing surplus seed from the seed cells. These cut-off means first engage the upper surface of the seed cells ahead of the ejector so as to force the surplus seeds back into the can. However, owing to the linty consistency of the cotton seed, it is often found that the seed hang to the plate after they have passed the ejector mechanism, and, therefore, I provide a second cut-off for the underside of the plate which engages this seed and forces it into the seed chute. If for any reason the seed should still hang to the plate, I provide a by-pass which enables the seed to pass back into the seed can without injuring the seed.

These and other features and objects of my invention will be more clearly understood by having reference to the accompanying drawings, in which I have illustrated one embodiment of my invention.

Fig. 1 is a perspective detail view showing the seed can tipped over and the base plate swung downward so that access may be had to the seed plate in the bottom thereof.

Fig. 2 is a rear view of the lower portion of the seed can.

Fig. 3 is a sectional view taken on the line 3—3 of Fig. 2, looking in the direction of the arrows.

Fig. 4 is a sectional view taken on the line 4—4 of Fig. 3, looking in the direction of the arrows.

Fig. 5 is a sectional view taken on the line 5—5 of Fig. 3, looking in the direction of the arrows, with a piece of the base ring shown in section to indicate the by-pass.

Fig. 6 is a detail view looking at the bottom of the seed can and seed plate, the base plate being removed.

As illustrated, I have shown a portion of a cotton planter consisting essentially of wheels 10 and 11 mounted upon an axle 12, together with the frame bars 15 and 16 which support a covering shovel frame 18.

A horizontal frame 34 is supported by the main frame somewhat above the latter and forms a platform for supporting the seed can 35. This seed can is carried by a base ring 33 which is pivotally mounted at one side by means of the hinge connection 36, and when in upright position may be held in place by means of the catch 37 which engages in the slot 38 in the base ring 33 of the seed can. This catch 37 is provided with the wing nut 39 which can be operated so as to tighten or loosen the catch, as is desired. Mounted upon one side of the platform frame 34 is a spout 40 which opens into the boot 41 through which the seed is dropped for planting. Mounted in the bottom of this seed can 36 is the cotton seed plate 42 which is held in place by a hinged base plate 43, which may be locked to the base of the can by means of the catch 44. This seed plate is provided with two eccentric driving lugs 45 which engage with the driving cross head 46 mounted upon the upper end of the squared stub shaft 47.

The power for driving the seed plate is derived from the main axle through the medium of a clutch and variable speed mechanism, whereby the speed of the seed plate may be varied in order to vary the number of seed dropped in any given distance, in the well known manner.

One of the important features of my invention is the easy manner in which, by my construction, the seed plate can be removed and a different plate or drop mechanism for planting corn or other varieties of seed substituted therefor. As shown in Fig. 1, the seed can or hopper is hinged at one side thereof and the bottom of this can is formed by means of the hinged plate 43 which hinged plate is locked in position by means of the catch 44. When it is desired to remove the cotton seed plate 42, it is merely necessary to tip the can over into the position shown in Fig. 1, and then swing the bottom plate downward so that it again rests upon the platform 34 and then ready access may be had to the seed plate 42 to permit the same to be removed through the bottom of the can without removing the seed in the hopper.

The cotton seed plate, I have illustrated, is of the well known type, and the usual picker wheel 63 is provided for ejecting the cotton seed from the individual cells in the periphery of the plate. As is well known, cotton seed is very linty and thus difficulty is experienced in that the seeds tend to stick together and thus crowd more than one seed into a cell and also the seed tend to stick to the bottom of the plate after coming into contact with the picker wheel and are thus apt to become cracked or broken. I provide special features for preventing more than one seed from entering each cell and also to remove the surplus seed hanging to the bottom of the cell and either force these seed down the seed chute or enable them to pass back freely into the hopper or seed can without cracking or injuring the same.

In order to accomplish these purposes, I provide in the bottom of the seed can a suitable cut-off for engaging the upper surface of the seed plate, which cut-off consists of a spirally-shaped extension 64 extending inward from the lower edge of the seed can and engaging with the upper surface of the seed plate just ahead of the ejector. This cut-off operates to gradually force any surplus seeds which happen to become lodged in one of the seed cells and are projecting above the same back into the hopper. However, it often happens that seed will stick to the lower surface of the plate after the picker wheel has operated to push the seed in the cell down the seed chute. In order to remove such surplus seed, I provide a cut-off for the bottom of the seed plate which consists of a projection on the base plate 43, which projects inward over the upper end of the spout 40 just beyond the ejector mechanism and is provided with an engaging edge 65 which operates to force the surplus seed hanging to the plate back down the seed chute.

In the event that any seed which is hanging to the bottom of the plate is not removed by means of this bottom cut-off 65, it is carried along by the seed plate and in order to permit this seed to be carried back again into the inside of the seed can or hopper, the wall of the base ring 33 of the seed can, just beyond the ejector wheel, is spaced apart from the periphery of the seed wheel, as indicated in Fig. 5, so as to form a by-pass 66 through which the seed may be carried back into the seed can without cracking or injuring the seed.

It will thus been seen that I have devised a very efficient structure in which the cotton seed plate may be easily removed through the bottom of the can without removing the seed from the can. Likewise, by means of the special cut-offs which engage both the upper and lower surface of the seed plate for removing surplus seeds, I insure very efficient planting, and the provision of the by-pass eliminates the danger of the cracking of any seed which remains hanging to the plate and permits this seed to be again carried back into the hopper without being injured.

While I have illustrated and described one particular embodiment of my invention, it will be understood that I do not wish to be limited to the exact construction shown and described but that various changes and modifications may be made without departing from the spirit and intent of my invention.

What I claim as my invention is:

1. In a cotton planter, a seed can, a seed plate located in the bottom of said can and provided with a series of seed cells, an ejector for ejecting the seed from said cells, and cut-off means engaging the lower surface of said cells at a point beyond said ejector for removing surplus seed hanging to the bottom of said seed plate.

2. In a cotton planter, a seed can, a seed plate located in the bottom of said can and provided with a series of seed cells, an ejector for ejecting the seed from said cells, cut-off means engaging with the upper surface of said seed cells at a point ahead of said ejector for removing the surplus seed from said cells and forcing the same back into the can, and cut-off means engaging the lower surface of said cells at a point beyond said ejector for removing surplus seed hanging to the bottom of said seed plate.

3. In a cotton planter, a seed can, a seed plate mounted at the bottom of said can and provided with a series of seed cells, an ejector for ejecting the seed from said cells, a spirally-shaped cut-off engaging with the upper surface of said seed cells at a point ahead of said ejector for gradually forcing the surplus seed back into the seed can and a second cut-off engaging with the lower surface of said cells at a point beyond said ejector for removing surplus seed hanging to the bottom of said seed plate.

4. In a cotton planter, a seed can, a seed plate located in the bottom of said can and provided with a series of seed cells, an ejector for ejecting the seed from said cells, cut-off means engaging with the upper surface of said seed cells at a point ahead of said ejector for removing the surplus seed from said cells and forcing the same back into the can, and cut-off mechanism engaging the lower surface of said cells at a point beyond said ejector, the inside wall of said seed can just beyond said ejector being spaced apart from the periphery of said seed cells thereby forming a by-pass to enable surplus seed to be carried back into said can without cracking the same.

5. In a cotton planter, a seed can, a seed plate mounted at the bottom of said can and provided with a series of seed cells, an ejector for ejecting the seed from said cells, a spirally-shaped cut-off engaging with the upper surface of said seed cells at a point ahead of said ejector for gradually forcing the surplus seed back into the seed can, and a second cut-off engaging with the lower surface of said cells at a point beyond said ejector, the inside wall of said seed can just beyond said ejector being spaced apart from the periphery of said seed cells thereby forming a by-pass to enable surplus seed to be carried back into said can without cracking the same.

6. In a cotton planter, a seed can, a seed plate mounted at the bottom of said can and provided with a series of seed cells, an ejector for ejecting the seed from said cells, a base plate for said seed can provided with a discharge opening through which the seed are ejected, and an extension from said base plate extending inward from one side of said opening and engaging the lower marginal surface of said seed plate at a point just beyond said ejector for removing surplus seed sticking to the lower surface of said plate.

7. In a cotton planter, a seed can, a seed plate mounted at the bottom of said can and provided with a series of seed cells, an ejector for ejecting the seed from said cells, a base plate for said seed can provided with a discharge opening through which the seed are ejected, and an extension from said base plate extending inward from one side of said opening and engaging the lower marginal surface of said seed plate at a point just beyond said ejector for removing surplus seed sticking to the lower surface of said plate, the lower edge of said seed can being spaced apart from the periphery of said seed plate at a point just beyond said ejector to thereby form a by-pass extending back into said seed can to enable surplus seed to be carried back into said can without injury to the same.

8. In a cotton planter, a seed can, a seed plate mounted at the bottom of said can and provided with a series of seed cells, an ejector for ejecting the seed from said cells, a base plate for said seed can provided with a discharge opening through which the seed are ejected, the lower edge of said seed can being spaced apart from the periphery of said seed plate at a point just beyond said ejector to thereby form a by-pass extending back into said can to enable surplus seed to be carried back into said can without injury to the same.

9. In a cotton planter, a frame, a seed can hinged at its lower edge to said frame, a seed plate provided with a series of seed cells about its periphery mounted in the lower portion of said can, and a base plate removably secured to the bottom of said can for holding said seed plate in position, said seed can being adapted to be tipped over and then said base plate removed from the bottom of the can to thereby permit the seed plate to be removed through the bottom of the can.

10. In a cotton planter, a frame, a seed can hinged at its lower edge to said frame, a seed plate provided with a series of seed cells about its periphery mounted in the lower portion of said can, and a base plate pivotally secured to the bottom of said can for holding said seed plate in position, said seed can adapted to be tipped over and then said base plate being swung about its pivot to thereby permit access to said seed plate so that the same may be removed through the bottom of the can.

11. In a cotton planter, a frame, a seed can hinged at its lower edge to said frame, a seed plate provided with a series of seed cells about its periphery mounted in the lower portion of said can, a base plate removably secured to the bottom of said can for holding said seed plate in position, said base plate having a central opening, a plurality of lugs extending downwardly from the bottom of said seed plate, a driving member adapted to engage said lugs for revolving said seed plate, said seed can being adapted to be tipped over to permit said base plate being removed from the bottom of the can to thereby permit access to the seed plate for removing the same through the bottom of the can.

Signed by me at Rock Island, Illinois, this 9 day of July, 1920.

LEE H. KAUPKE.